(12) United States Patent
Cai et al.

(10) Patent No.: US 11,994,773 B2
(45) Date of Patent: *May 28, 2024

(54) BACKLIGHT MODULE INCLUDING THROUGH-HOLE AND DISPLAY DEVICE INCLUDING THE SAME

(71) Applicants: Beijing BOE Optoelectronics Technology Co., Ltd., Beijing (CN); BOE Technology Group Co., Ltd., Beijing (CN)

(72) Inventors: Xiujun Cai, Beijing (CN); Cuie Wang, Beijing (CN); Sa Li, Beijing (CN); Wenli Lan, Beijing (CN); Dong Wang, Beijing (CN); Dawei Wang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,605

(22) Filed: Jan. 18, 2023

(65) Prior Publication Data

US 2023/0266623 A1 Aug. 24, 2023

Related U.S. Application Data

(63) Continuation of application No. 17/478,087, filed on Sep. 17, 2021, now Pat. No. 11,579,490.

(30) Foreign Application Priority Data

Dec. 2, 2020 (CN) .......................... 202022855084.0

(51) Int. Cl.
*G02F 1/13357* (2006.01)
*F21V 8/00* (2006.01)
(Continued)

(52) U.S. Cl.
CPC ..... *G02F 1/133608* (2013.01); *G02B 6/0051* (2013.01); *G02B 6/0053* (2013.01);
(Continued)

(58) Field of Classification Search
CPC .. G02B 6/0051; G02B 6/0053; G02B 6/0055; G02B 6/0088; G02F 1/133314;
(Continued)

(56) References Cited

U.S. PATENT DOCUMENTS

2020/0174319 A1  6/2020  Chang
2021/0072594 A1  3/2021  Zhang et al.
2021/0333466 A1  10/2021  Zhou et al.

OTHER PUBLICATIONS

U.S. Appl. No. 17/478,087 Non-Final Office Action dated Jun. 30, 2022.
(Continued)

*Primary Examiner* — Keith G. Delahoussaye
(74) *Attorney, Agent, or Firm* — IPro, PLLC

(57) ABSTRACT

The embodiments of the application provide a backlight module and a displaying device, relating to the technical field of display. The backlight module comprises a first support structure, an optical film material and a buffer structure; the first support structure is arranged on a side away from a light-outgoing side of the optical film material, and the first support structure and the optical film material have a through-hole; the buffer structure comprises a first buffer portion arranged in the through-hole, and a rigidity of the first buffer portion is less than a rigidity of the first support structure. The backlight module is internally provided with the buffer structure, and the first buffer portion in the buffer structure is arranged in the through-hole that penetrates through the first support structure and the optical film material.

16 Claims, 2 Drawing Sheets

(51) Int. Cl.
 *G02F 1/1333* (2006.01)
 *H04M 1/02* (2006.01)
(52) U.S. Cl.
 CPC ......... *G02B 6/0055* (2013.01); *G02B 6/0088* (2013.01); *G02F 1/133308* (2013.01); *H04M 1/0264* (2013.01); *H04M 1/0266* (2013.01); *G02F 2201/07* (2013.01)
(58) Field of Classification Search
 CPC ........... G02F 1/13317; G02F 1/133608; G02F 2201/07; H04M 1/0264; H04M 1/0266
 See application file for complete search history.

(56) References Cited

OTHER PUBLICATIONS

U.S. Appl. No. 17/478,087 Notice of Allowance and Fees Due dated Oct. 13, 2022.
U.S. Appl. No. 17/478,087 Corrected Notice of Allowance and Fees Due dated Oct. 19, 2022.

BACKLIGHT MODULE INCLUDING THROUGH-HOLE AND DISPLAY DEVICE INCLUDING THE SAME

CROSS REFERENCE TO RELEVANT DISCLOSURES

The present disclosure is a continuation application of U.S. application Ser. No. 17/478,087, filed on Sep. 17, 2021, and claims benefit of the filing date of Chinese Patent Application No. 202022855084.0 filed on Dec. 2, 2020, the disclosure of which is hereby incorporated in its entirety by reference.

TECHNICAL FIELD

The application relates to the technical field of display, in particular to a backlight module and a displaying device.

BACKGROUND

To ensure that a displaying device has a narrow frame, the shape of the displaying device becomes diversified. A full screen, a blind-hole screen, a water-drop screen, etc. have emerged. Among them, the blind-hole screen is able to extremely the minimize the frame of the displaying device.

At present, in the displaying device with a blind-hole screen, an optical film material of a backlight module is provided with a performative through-hole. The through-hole is internally provided with a rigid support structure which enhances the strength of the backlight module. The rigid support structure is arranged along a side wall of the through-hole.

SUMMARY

The embodiments of the disclosure further disclose a displaying device, comprising a display panel, and the backlight module;
- the backlight module comprises a first support structure, an optical film material and a buffer structure:
- the first support structure is arranged on a side away from a light-outgoing side of the optical film material, and the first support structure and the optical film material have a through-hole;
- the buffer structure comprises a first buffer portion arranged in the through-hole, and a rigidity of the first buffer portion is less than a rigidity of the first support structure;
- the display panel is arranged on the light-outgoing side of the backlight module;
- the display panel comprises a color film substrate and an array substrate which are arranged in boxes opposite to each other, a first polarizer arranged on a side of the color film substrate away from the array substrate, and a second polarizer arranged on a side of the array substrate away from the color film substrate;
- wherein orthographic projections of the first polarizer on the plane where the first support structure is located are not superimposed with the orthographic projection of the through-hole on the plane where the first support structure is located.

Optionally, the sum of thicknesses of the first support structure and the optical film material is equal to a height of the first buffer portion in a direction perpendicular to the extension direction of the first support structure.

Optionally, the first buffer portion is made of an elastic material.

Optionally, the first support structure is made of a rigid material.

Optionally, the buffer structure further comprises a second buffer portion, the second buffer portion is arranged on a side of the first support structure away from the optical film material;
- wherein the first buffer portion is perpendicularly connected to the second buffer portion, and a rigidity of the second buffer portion is less than the rigidity of the first support structure.

Optionally, the first buffer portion has a hollow area arranged along the direction perpendicular to the first support structure, and an orthographic projection of the hollow area on a plane where the first support structure is located is positioned within an orthographic projection of the through-hole on the plane where the first support structure is located.

Optionally, the hollow area is surrounded by a side of the first buffer portion away from the side wall of the through-hole, and the hollow area penetrates through the first buffer portion.

Optionally, the material of the second buffer portion is the same as the material of the first buffer portion, and the first buffer portion and the second buffer portion are installed at one time.

Optionally, the backlight module further comprises a first light shielding adhesive;
- wherein the first light shielding adhesive covers a first surface of the first buffer portion and extends to a surface of the light-outgoing side of the optical film material, and the first surface of the first buffer portion is a surface of the first buffer portion toward the light-outgoing side of the optical film material.

Optionally, further comprising a second support structure detachably embedded in the hollow area;
- wherein the second support structure comprises a first support portion and a second support portion which are perpendicularly connected to each other, the first support portion is arranged in the hollow area, and the second support portion is arranged on a side of the second buffer portion away from the first support structure.

Optionally, a distance from a second surface of the first support portion to a third surface of the second support portion is greater than or equal to a distance from the first surface of the first buffer portion to the third surface of the second support portion;
- the first surface of the first buffer portion is a surface of the first buffer portion toward the light-outgoing side of the optical film material, the second surface of the first support portion is a surface of the first support portion toward the light-outgoing side of the optical film material, and the third surface of the second support portion is a surface of the second support portion away from the light-outgoing side of the optical film material.

Optionally, the optical film material comprises a reflector plate, a light guide plate, a diffusing plate and a brightness enhancement film in sequence along a direction perpendicular to the extension direction of the first support structure and away from the first support portion.

Optionally, the displaying device further comprises a camera, wherein the camera is arranged in a hollow area of the first buffer portion.

Optionally, orthographic projections of and the second polarizer on a plane where the first support structure is located are not superimposed with an orthographic projection of the through-hole on the plane where the first support structure is located.

Optionally, a second light shielding adhesive is arranged on a side of the array substrate away from the color film substrate, the second light shielding adhesive is arranged on a side of the second polarizer close to the through-hole, and the second light shielding adhesive is bonded with the first light shielding adhesive in the backlight module.

Optionally, the displaying device further comprises a cover plate; and the cover plate is adhered through a bonding layer to a side of the display panel away from the backlight module.

BRIEF DESCRIPTION OF THE DRAWINGS

To describe the technical solutions in the embodiments of the application more clearly, the drawings required to be used in the embodiments of the application will be simply introduced below. Obviously, the drawings depicted below only illustrate some embodiments of the application. Other drawings may further be obtained by a person of ordinary skill in the art according to these drawings without creative work.

DETAILED DESCRIPTION

The technical solution in the embodiments of the application will be described clearly and completely in conjunction with accompanying drawings in the embodiments of the application. Apparently, the described embodiments are merely illustrative ones, and are not all possible ones of the application. Based on embodiments in the application, all other embodiments obtained by a person of ordinary skill in the art without creative labor shall fall within the protective scope of the embodiments of the application.

Figure 1:
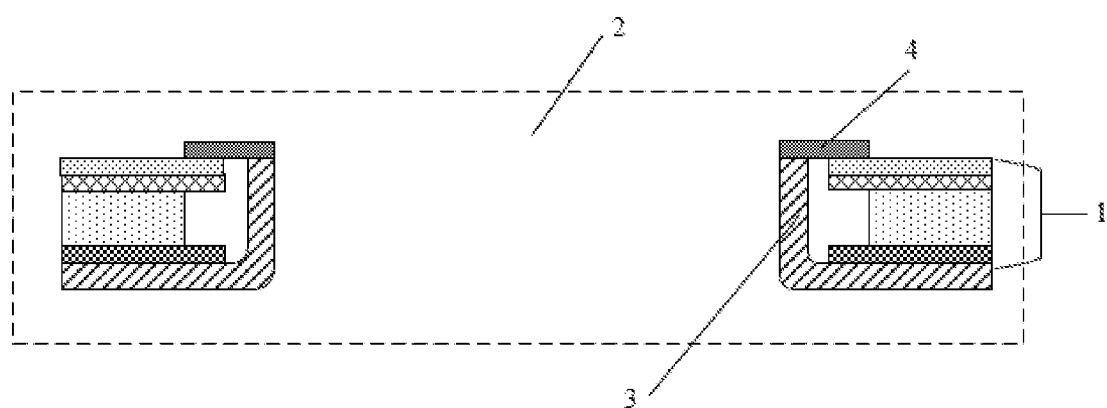
FIG. 1 illustrates a sectional schematic diagram of a backlight module in the related art.

In related art, as shown in FIG. 1, a backlight module comprises an optical film material 1, and the optical film material 1 of the backlight module is provided with a first through-hole. To enhance the strength of the backlight module, a rigid support structure 3 is stretched and bent, such that the rigid support structure 3 extends into the first through-hole. The rigid support structure 3 located in the first through-hole forms a second through-hole 2 along a side wall of the first through-hole. The rigid support structure 3 is usually made of an iron material. When a displaying device with the backlight module is subject to the reliability test, the optical film material 1 in the backlight module collides with the rigid support structure 3 which forms the second through-hole 2, thus resulting in breakage of the optical film material 1 to make the backlight module abnormal.

Figure 2:
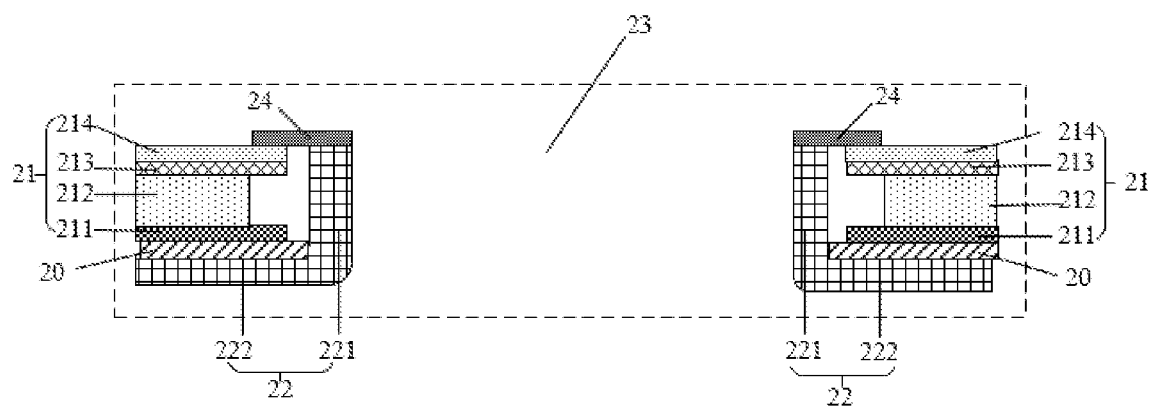
FIG. 2 illustrates a sectional schematic diagram of a backlight module according to the embodiments of the application.

Refer to FIG. 2, which illustrates a schematic diagram of a backlight module according to the embodiments of the application.

The disclosure provides a backlight module. The backlight module comprises a first support structure 20, an optical film material 21 and a buffer structure 22; the first support structure 20 is arranged on a side away from a light-outgoing side of the optical film material 21, and the first support structure 20 and the optical film material 21 have a through-hole; the buffer structure 22 comprises a first buffer portion 221 arranged in the through-hole, and the rigidity of the first buffer portion 221 is less than the rigidity of the first support structure 20.

In the embodiments of the disclosure, the first support structure 20 in the backlight module is configured to support the optical film material 21 located thereon; the buffer structure 22 comprises a first buffer portion 221; the first buffer portion 221 is arranged along a side wall of the through-hole; the side wall of the through-hole is formed by lateral faces of the first support structure 20 and the optical film material 21 toward the through-hole, wherein a rigidity of the first buffer portion 221 is less than a rigidity of the first support structure 20.

The forming process of the through-hole that penetrates through the first support structure 20 and the optical film material 21 is as follows: forming a first hole on the first support structure 20 first; then, forming a second hole on the optical film material 21; next, when the first support structure 20 and the optical film material 21 are fixed together, aligning the second hole and the first hole with each other, such that the second hole and the first hole form the through-hole that penetrates through the first support structure 20 and the optical film material 21.

Wherein, the width of the first buffer portion 221 along a direction perpendicular to the side wall of the through-hole is greater than or equal to 0.4 mm; the first buffer portion 221 is made of an elastic material, for example, foam materials, and the first support structure 20 is made of a rigid material, for example, iron materials.

In the embodiments of the disclosure, the buffer structure 22 is arranged in the backlight module, and the first buffer portion 221 in the buffer structure 22 is arranged in the through-hole that penetrates through the first support structure 20 and the optical film material 21, such that the first buffer portion 221 in the buffer structure 22 protects the optical film material 21 after contacting the optical film material 21 during a reliability test as the rigidity of the first buffer portion 221 is less than the rigidity of the first support structure 20, thus avoiding breakage of the optical film material 21 and further preventing abnormalities of the backlight module arising from the breakage of the optical film material 21.

In addition, in the related art, as shown in FIG. 1, when it needs to form a second through-hole 2, a material which forms a rigid support structure 3 needs to be punched, such that one part of the rigid support structure 3 is located in the first through-hole. However, when the second through-hole 2 is formed in this way, a smaller aperture of the second through-hole 2 leads to a smaller height of the formed second through-hole 2, whereas the thickness of the optical film material 1 has defined the height of the first through-hole. Since the rigid support structure 3 that forms the second through-hole 2 needs to support a display panel which will be formed later, the height of the formed second through-hole 2 needs to be at least the same as the height of the first through-hole, that is, the height of the second through-hole 2 is also defined by the thickness of the optical film material 1. Therefore, the aperture of the second through-hole 2 is also defined to be not too small, and a second through-hole 2 with a small aperture will not be formed. In the embodiments of the disclosure, the first support structure 20 is arranged only on a side away from the light-outgoing side of the optical film material 21, and does not need to extend into the through-hole, so the material that forms the first support structure 20 may be directly bored according to the aperture of the through-hole to be formed, and the aperture is not limited by the height of the through-hole. Moreover, the first buffer structure 221 located in the through-hole is formed by an independent mold, and its forming process is also not limited by the aperture of the through-hole, so a through-hole with a small aperture is formed.

In the embodiments of the disclosure, the sum of thicknesses of the first support structure and the optical film material 21 is equal to the height of the first buffer portion 221 in a direction perpendicular to the first support structure 20.

When the sum of the thicknesses of the first support structure 20 and the optical film material 21 is set to be equal to the height of the first buffer portion 221, a light-outgoing surface of the optical film material 21 and a surface of the first buffer portion 221 toward the light-outgoing side of the optical film material 21 are located on the same plane. Providing that the light-outgoing surface of the optical film material 21 and the surface of the first buffer portion 221 toward the light-outgoing side of the optical film material 21 are not located on the same plane, that is, a segment gap exists between the light-outgoing surface of the optical film material 21 and the surface of the first buffer portion 221 toward the light-outgoing side of the optical film material 21, the first light shielding adhesive 24 adheres hardly and loosely and tends to leak light when the first light shielding adhesive 24 is adhered to the light-outgoing surface of the optical film material 21 and the surface of the first buffer portion 221 toward the light-outgoing side of the optical film material 21 later. In the embodiments of the disclosure, the light-outgoing surface of the optical film material 21 and the surface of the first buffer portion 221 toward the light-outgoing side of the optical film material 21 are located on the same plane, that is, no segment gap exists between the light-outgoing surface of the optical film material 21 and the surface of the first buffer portion 221 toward the light-outgoing side of the optical film material 21, so the first light shielding adhesive 24 adheres easily and firmly, with little probability of light leak, when the first light shielding adhesive 24 is adhered to the light-outgoing surface of the optical film material 21 and the surface of the first buffer portion 221 toward the light-outgoing side of the optical film material 21 later.

In addition, the first support portion 221 arranged may also play a certain role of supporting other parts that are formed on the backlight module later.

In the embodiments of the disclosure, the buffer structure 22 further comprises a second buffer portion 222, and the second buffer portion 222 is arranged on one side of the first support portion 20 away from the optical film material 21, wherein the first buffer portion 221 is perpendicularly connected to the second buffer portion 222, and the rigidity of the second buffer portion 222 is less than the rigidity of the first support structure 20.

Specifically, the buffer structure 22 further comprises the second buffer portion 222, and the second buffer portion 222 is arranged on one side of the first support structure 20 away from the optical film material 21. Since the rigidity of the second buffer portion 222 is less than the rigidity of the first support structure 20, during installation of other functional devices later, the arrangement of the second buffer portion 222 may also avoid the problem of damage to the functional devices due to direct contact between the first support structure 20 and the functional devices. As the second buffer portion 222 is able to protect the functional devices that need to be installed later, adhering an extra buffer part is not required during installation of functional devices later.

In addition, the material of the second buffer portion 222 is the same as the material of the first buffer portion 221, and the first buffer portion 221 and the second buffer portion 222 are integrally molded, so the second buffer portion 222 is manufactured while the first buffer portion 221 is formed. In the installation process, since the first buffer portion 221 and the second buffer portion 222 are integrally molded, the first buffer portion 221 and the second buffer portion 222 may be installed at one time, simplifying the process.

In the embodiments of the application, the first buffer portion 221 has a hollow area 23 arranged along a direction perpendicular to the first support structure 20, and the orthographic projection of the hollow area 23 on the plane where the first support structure 20 is located is positioned in the orthographic projection of the through-hole on the plane where the first support structure 20 is located.

The hollow area 23 of the first buffer portion 221 is arranged along the direction perpendicular to the first support structure 20. The hollow area 23 is surrounded by a side of the first buffer portion 221 away from the side wall of the through-hole, and the hollow area 23 penetrates through the first buffer portion 221.

The first buffer portion 221 is of a columnar structure with the hollow area 23. The columnar structure may be a cylindrical columnar structure, or other polygonal columnar structures. The second buffer portion 222 is also a columnar structure with a hollow area. The columnar structure that forms the second buffer portion 222 may be a cylindrical columnar structure or other polygonal columnar structure. The orthographic projection of the hollow area of the second buffer portion 222 on the plane where the first support structure 20 is located is superimposed with that of the hollow area 23 of the first buffer portion 221 on the plane where the first support structure 20 is located. The width of the second buffer portion 222 is greater than that of the first buffer portion 221 along the direction perpendicular to the side wall of the through-hole, and the height of the second buffer portion 222 is smaller than that of the first buffer portion 221 along the direction parallel to the side wall of the through-hole, so the buffer structure 22 jointly formed by the first buffer portion 221 and the second buffer portion 222 is shaped like a boss with a hollow structure.

Figure 3:
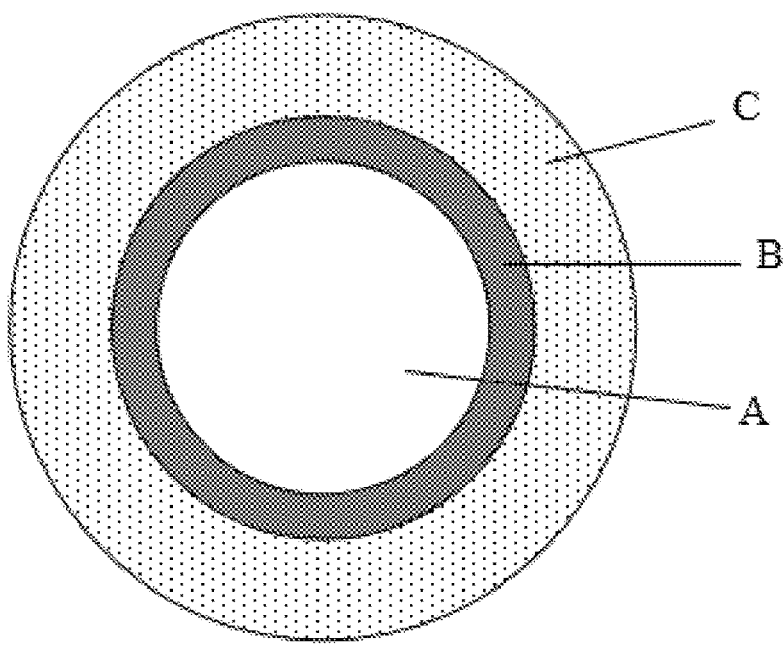
FIG. 3 illustrates a top view of a buffer structure according to the embodiments of the application.

The orthographic projections of the first buffer portion 221 and the second buffer portion 222 on the plane where the first support structure 20 is located are closed patterns. The closed patterns may be round, polygonal, etc. Specific patterns may be set by those skilled in the art according to actual situations, and are not limited in the disclosure. When the first buffer portion 221 is of a cylindrical columnar structure with the hollow area 23, and the second buffer portion 222 is also of a cylindrical columnar structure with a hollow area, the orthographic projection of the buffer structure 22 on the plane where the first support structure 20 is located is as shown in FIG. 3. Circle A represents the orthographic projection of the hollow area 23; hollow loop B represents the orthographic projection of the first buffer portion 221, and the hollow loop C represents the orthographic projection of the second buffer portion 222.

In the embodiments of the disclosure, the backlight module further comprises a first light shielding adhesive 24; the first light shielding adhesive 24 covers a first surface of the first buffer portion 221 and extends to a surface of the light-outgoing side of the optical film material 21, and the first surface of the first buffer portion 221 is the surface of the first buffer portion 221 toward the light-outgoing side of the optical film material 21.

Specifically, the backlight module further comprises the first light shielding adhesive 24, and the light shielding adhesive 24 is arranged on the surface of the first buffer portion 221 toward the light-outgoing side of the optical film material 21. Since the width of the first buffer portion 221 along the direction perpendicular to the side wall of the through-hole is greater than or equal to 0.4 mm, which is wide enough, a sufficient bonding area is able to be guaranteed between the first light shielding adhesive 24 and the surface of the first buffer portion 221 toward the light-outgoing side of the optical film material 21, such that the first light shielding adhesive 24 and the surface of the first buffer portion 221 toward the light-outgoing side of the optical film material 21 may be firmly bonded, avoiding light leaking out of the backlight module.

Further, the first light shielding adhesive 24 furthermore extends to the surface of the optical film material 21 on the light-outgoing side, that is, the first light shielding adhesive 24 also covers a light-outgoing surface of the optical film material 21 close to the position of the through-hole, such that the optical film material 21 and the first buffer portion 221 are fixed together. The first light shielding adhesive 24 may be a double sided adhesive tape to fix together the optical film material 21, the first buffer portion 221 and the display panel formed later. The coverage area of the first light shielding adhesive 24 on the optical film material 21 may be determined upon specific situations, and is not limited in the embodiments of the application.

It should be noted that in the related art, as shown in FIG. 1, since the first light shielding adhesive 4 is adhered to the rigid support structure 3 that forms the second through-hole 2, and the width of the rigid support structure 3 that forms the second through-hole 2 is usually 0.1 mm along the direction perpendicular to a side wall of the second through-hole 2, the surface, toward the light-outgoing side of the optical film material 1, of the rigid support structure 3 that forms the second through-hole 2 has a small area. In the process that the first light shielding adhesive 4 is bonded with the rigid support structure 3 that forms the second through-hole 2, since the bonding area is very small, the first light shielding adhesive 4 and the rigid support structure 3 that forms the second through-hole 2 are unstably bonded, prone to leaking light. To avoid the phenomenon of light leak, a side of the first light shielding adhesive 4 close to the second through-hole 2 needs to be coated with a layer of light shielding adhesive to prevent light from leaking out of the backlight module, so that the forming process of the backlight module is complicated. Moreover, since a side of the first light shielding adhesive 4 close to the second through-hole 2 is coated with one more layer of light shielding adhesive, and the light shielding adhesive occupies certain space in the second through-hole 2 to affect the size of the space for placing functional devices in the second through-hole 2, a large second through-hole 2 is required when the second through-hole 2 needs sufficient internal space to place the functional devices. The second-hole 2 occupies more area in the backlight module to affect the area of a light-emitting region in the backlight module, so it fails to manufacture a small-aperture through-hole in the backlight module.

In the embodiments of the disclosure, the bonding area between the first light shielding adhesive 24 and the surface of the first buffer portion 221 toward the light-outgoing side of the optical film material 21 is large enough, thus avoiding the problem of light leaks of the backlight module. As the backlight module does not leak light, it does not need to coat one more layer of light shielding adhesive on one side of the first light shielding adhesive 24 close to the through-hole. Therefore, the forming process of the backlight module is simplified, and the size of the hollow area 23 for placing functional devices is not affected, thus realizing manufacturing of a small-aperture through-hole in the backlight module.

In the embodiments of the disclosure, the backlight module further comprises a second support structure 25 that is detachably embedded in the hollow area 23, wherein the second support structure 25 comprises a first support portion 251 and a second support portion 252 which are perpendicularly connected to each other, the first support portion 251 is arranged in the hollow area 23, and the second support portion 252 is arranged on a side of the second buffer portion 222 away from the first support structure 20.

Figure 4:
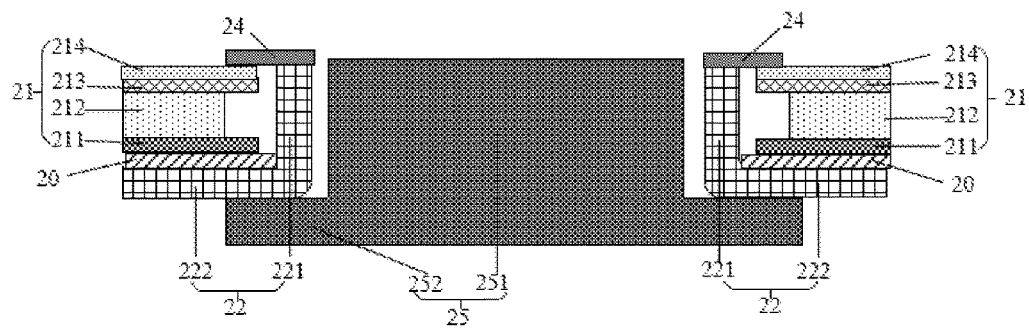
FIG. 4 illustrates a sectional schematic diagram of a backlight module with a second support structure according to the embodiments of the application.

Specifically, in the embodiments of the disclosure, since the first buffer portion 221 located in the through-hole has a low rigidity, the second support structure 25 needs to be embedded in the hollow area 23 of the first buffer portion 221 to prevent a deformation of the first buffer portion 221. As shown in FIG. 4, the second support structure 25 is shaped like a boss, comprising the first support portion 251 and the second support portion 252, wherein the first support portion 251 and the second support portion 252 are perpendicularly connected.

The second support structure 25 is detachably embedded in the hollow area 23 of the first buffer portion 221. When the functional device needs to be installed in the hollow area 23, the second support structure 25 embedded in the hollow area 23 needs to be removed first, and then the functional device is installed in the hollow area 23 after the second support structure 25 is removed. When it does not need to install the functional device, the second support structure 25 is embedded in the hollow area 23, such that the first support portion 251 is located in the hollow area 23, while the second support portion 252 is located on a side of the second buffer portion 222 away from the first support structure 20. Since the rigidity of the second support structure 25 is greater than that of the first buffer portion 221, the arrangement of the second support structure 25 may not only prevent deformation of the first buffer portion 221, but also enhance the strength of the backlight module.

Wherein, the first support portion 251 may be of a hollow or solid structure, which is not limited in embodiments of the disclosure. The material of the second support structure 25 may be transparent acrylic-based resin, etc.

In the embodiments of the disclosure, a distance from a second surface of the first support portion 251 to a third surface of the second support portion 252 is greater than or equal to a distance from the first surface of the first buffer portion 221 to the third surface of the second support portion 252; the first surface of the first buffer portion 221 is the surface of the first buffer portion 221 toward the light-outgoing side of the optical film material 21, the second surface of the first support portion 251 is the surface of the first support portion 251 toward the light-outgoing side of the optical film material 21, and the third surface of the second support portion 252 is the surface of the second support portion 252 away from the light-outgoing side of the optical film material 21.

Specifically, when the distance from the second surface of the first support portion 251 to the third surface of the second support portion 252 is greater than the distance from the first surface of the first buffer portion 221 to the third surface of the second support portion 252, the second surface of the first support portion 251 is configured to project out of the first surface of the first buffer portion 221; when the distance from the second surface of the first buffer portion 251 to the third surface of the second support portion 252 is equal to the distance from the first surface of the first buffer portion 221 to the third surface of the second support portion 252, the second surface of the first support portion 251 and the first surface of the first buffer portion 221 are located on the same plane.

As the distance from the second surface of the first buffer portion 251 to the third surface of the second support portion 252 is set to be greater than or equal to the distance from the first surface of the first buffer portion 221 to the third surface of the second support portion 252, during subsequent assembling of the backlight module and the display panel, the first support portion 251 is able to support the display panel, avoiding excessive pressure on the first buffer portion 221 from the display panel, which may otherwise deform the first buffer portion 221.

In the embodiments of the disclosure, the optical film material 21 comprises a reflector plate 211, a light guide plate 212, a diffusing plate 213 and a brightness enhancement film 214 in sequence, along a direction that is perpendicular to the first support structure 20 and away from the first support portion 20.

Specifically, the reflector plate 211 is arranged on a side of the first support structure 20 away from the second buffer portion 222; the light guide plate 212 is arranged on a side of the reflector plate 211 away from the first support structure 20; the diffusing plate 213 is arranged on a side of the light guide plate 212 away from the reflector plate 211; and the brightness enhancement film 214 is arranged on a side of the diffusing plate 213 away from the light guide plate 212.

It should be noted that in the embodiments of the disclosure, the first support structure 20 is formed with the first hole first, and then the first support structure 20 with the first hole is assembled with the buffer structure 22, such that the first support structure 20 is located on one side of the second buffer portion 222 toward the light-outgoing side of the backlight module. Then, the reflector plate 211, the light guide plate 212, the diffusing plate 213 and the brightness enhancement film 214 which respectively have a second hole are arranged in sequence along the direction that is perpendicular to the first support structure 20 and away from the first support structure 20. The positions of the second hole on the reflector plate 211, the light guide plate 212, the diffusing plate 213 and the brightness enhancement film 214 all correspond to the position of the first hole formed on the first support structure 20.

Wherein, since the first light shielding adhesive 24 covers the first surface of the first buffer portion 221 and extends to the surface of the light-outgoing side of the optical film material 21, and the brightness enhancement film 214 is the layer in the optical film material 21 closest to the first light shielding adhesive 24. Thus, it may be known that, the first light shielding adhesive 24 is able to extend to a surface, on one side away from the diffusing plate 213, of the brightness enhancement film 214 in the optical film material 21. The brightness enhancement film 214 and the first buffer portion 221 are fixed together through the first light shielding adhesive 24.

In the embodiments of the disclosure, the backlight module is internally provided with the buffer structure, and the first buffer portion in the buffer structure is arranged in the through-hole that penetrates through the first support structure and the optical film material, such that the first buffer portion in the buffer structure protects the optical film material after contacting the optical film material during a reliability test as the rigidity of the first buffer portion is less than the rigidity of the first support structure, thus avoiding breakage of the optical film material and further preventing abnormalities of the backlight module arising from breakage of the optical film material.

Figure 5:
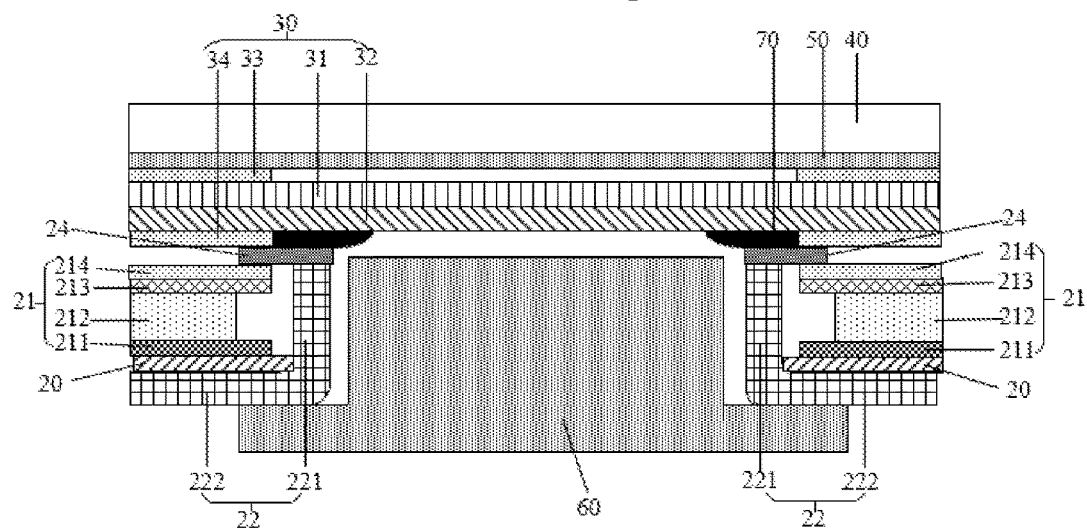
FIG. 5 illustrates a sectional schematic diagram of a displaying device according to the embodiments of the application.

The embodiments of the disclosure further comprise a displaying device. As shown in FIG. 5, the displaying device comprises a display panel 30, a cover plate 40 and the aforementioned backlight module; the display panel 30 is arranged on the light-outgoing side of the backlight module, and the cover plate 40 is adhered through a bonding layer 50 to a side of the display panel away from the backlight module.

Wherein, the bonding layer 50 which is used to bond the cover plate 40 and the display panel 30 together is a transparent adhesive tape, which does not affect the transmissivity of the display panel while realizing a fixed connection between the cover plate 40 and the display panel 30.

The displaying device further comprises a camera 60, wherein the camera 60 is arranged in the hollow area 23 of the first buffer portion 221.

Specifically, prior to the arrangement of the camera 60 in the hollow area 23 of the first buffer portion 221, the second support structure 25 which is embedded in the hollow area 23 is removed first, and then the camera 60 is installed in the hollow area 23.

The display panel 30 comprises a color film substrate 31 and an array substrate 32 that are arranged in boxes opposite to each other, a first polarizer 33 arranged on one side of the color film substrate 31 away from the array substrate 32, and a second polarizer 34 arranged on a side of the array substrate 32 away from the color film substrate 31, wherein the orthographic projections of the first polarizer 33 and the second polarizer 34 on the plane where the first support structure 20 is located are not superimposed with the orthographic projection of the through-hole on the plane where the first support structure 20 is located.

Specifically, a structure in the first polarizer 33 at a position corresponding to the through-hole in the backlight module is removed before the first polarizer 33 is adhered to a side of the color film substrate 31 away from the array substrate 32, a structure in the second polarizer 34 at a position corresponding to the through-hole in the backlight module is removed before the second polarizer 34 is adhered to a side of the array substrate 32 away from the color film substrate 31, such that the orthographic projections of the first polarizer 33 and the second polarizer 34 on the plane where the first support structure 20 is located are not superimposed with the orthographic projection of the through-hole on the plane where the first support structure 20 is located. Thus, the camera 60 is able to fully receive light rays from the outside environment through the display panel 30.

In the embodiments of the disclosure, a second light shielding adhesive 70 is arranged on a side of the array substrate 32 away from the color film substrate 31. The second light shielding adhesive 70 is arranged on one side of the second polarizer 34 close to the through-hole, and the second light shielding adhesive 70 is bonded with the first light shielding adhesive 24 in the backlight module.

Specifically, before the display panel 30 is bonded with the backlight module, the second light shielding adhesive 70 is arranged on one side of the array substrate 32 away from the color film substrate 31 and the second light shielding adhesive 70 is positioned on one side of the second polarizer 34 close to the through-hole, so as to prevent light rays from leaking from the position of the second polarizer 34. The second light shielding adhesive 70 and the first light shielding adhesive 24 share a superimposed area. The second light shielding adhesive 70 and the first light shielding adhesive 24 are bonded together to jointly realize fixed connection between the display panel 30 and the backlight module, wherein the second light shielding adhesive 70 is glue.

The embodiments of the disclosure have the following advantages:

In the embodiments of the disclosure, the backlight module is internally provided with the buffer structure, and the first buffer portion in the buffer structure is arranged in the through-hole that penetrates through the first support structure and the optical film material, such that the first buffer portion in the buffer structure protects the optical film material after contacting the optical film material during a reliability test as the rigidity of the first buffer portion is less than the rigidity of the first support structure, thus avoiding breakage of the optical film material and further preventing abnormalities of the backlight module arising from breakage of the optical film material.

Despite the description of the preferred embodiments of the disclosure, those skilled in the art are able to make additional variations and amendments to those embodiments when they know the basic innovative concept. Therefore, the appended claims are intended to be explained as including the preferred embodiments and all variations and amendments that fall within the scope of the embodiments of the disclosure.

Finally, it should also be noted that, in thus text, terms "comprise", "include" or any other variations thereof refer to non-exclusive inclusion, so a process, method, article or terminal device comprising a series of elements not only comprise those elements listed, but also comprise other elements that are not explicitly listed or inherent elements of the process, method, article or terminal device. In the absence of more restrictions, a process, method, article or terminal device comprising an element defined by "one" shall not exclusive of other identical elements.

The above are merely specific embodiments of the disclosure, and should not be construed as limiting the protective scope of the disclosure. Those ordinarily skilled in the art may easily make variations and amendments to the above embodiments within the scope of the disclosure, and all those variations and amendments shall fall within the protective scope of the disclosure. Therefore, the protective scope of the disclosure shall be subject to that of the claims.

The invention claimed is:

1. A displaying device, comprising a display panel and a backlight module;
  wherein the backlight module comprises a first support structure, an optical film material and a buffer structure:
  the first support structure is arranged on a side away from a light-outgoing side of the optical film material, and the first support structure and the optical film material have a through-hole;
  the buffer structure comprises a first buffer portion arranged in the through-hole, and a rigidity of the first buffer portion is less than a rigidity of the first support structure;
  wherein the display panel is arranged on a light-outgoing side of the backlight module;
  the display panel comprises a color film substrate and an array substrate which are arranged in boxes opposite to each other, a first polarizer arranged on a side of the color film substrate away from the array substrate, and a second polarizer arranged on a side of the array substrate away from the color film substrate;
  wherein orthographic projections of the first polarizer on the plane where the first support structure is located are not superimposed with the orthographic projection of the through-hole on the plane where the first support structure is located.

2. The displaying device according to claim 1, wherein the sum of thicknesses of the first support structure and the optical film material is equal to a height of the first buffer portion in a direction perpendicular to the extension direction of the first support structure.

3. The displaying device according to claim 1, wherein the first buffer portion is made of an elastic material.

4. The displaying device according to claim 1, wherein the first support structure is made of a rigid material.

5. The displaying device according to claim 1, wherein the buffer structure further comprises a second buffer portion, the second buffer portion is arranged on a side of the first support structure away from the optical film material;
  wherein the first buffer portion is perpendicularly connected to the second buffer portion, and a rigidity of the second buffer portion is less than the rigidity of the first support structure.

6. The displaying device according to claim 5, wherein the first buffer portion has a hollow area arranged along the direction perpendicular to the first support structure, and an orthographic projection of the hollow area on a plane where the first support structure is located is positioned within an orthographic projection of the through-hole on the plane where the first support structure is located.

7. The displaying device according to claim 6, wherein the hollow area is surrounded by a side of the first buffer portion away from the side wall of the through-hole, and the hollow area penetrates through the first buffer portion.

8. The displaying device according to claim 1, wherein the material of the second buffer portion is the same as the material of the first buffer portion, and the first buffer portion and the second buffer portion are installed at one time.

9. The displaying device according to claim 1, wherein the backlight module further comprises a first light shielding adhesive;
  wherein the first light shielding adhesive covers a first surface of the first buffer portion and extends to a surface of the light-outgoing side of the optical film material, and the first surface of the first buffer portion is a surface of the first buffer portion toward the light-outgoing side of the optical film material.

10. The displaying device according to claim 6, further comprising a second support structure detachably embedded in the hollow area;
  wherein the second support structure comprises a first support portion and a second support portion which are perpendicularly connected to each other, the first support portion is arranged in the hollow area, and the second support portion is arranged on a side of the second buffer portion away from the first support structure.

11. The displaying device according to claim 10, wherein a distance from a second surface of the first support portion to a third surface of the second support portion is greater than or equal to a distance from the first surface of the first buffer portion to the third surface of the second support portion;
the first surface of the first buffer portion is a surface of the first buffer portion toward the light-outgoing side of the optical film material, the second surface of the first support portion is a surface of the first support portion toward the light-outgoing side of the optical film material, and the third surface of the second support portion is a surface of the second support portion away from the light-outgoing side of the optical film material.

12. The displaying device according to claim 1, wherein the optical film material comprises a reflector plate, a light guide plate, a diffusing plate and a brightness enhancement film in sequence along a direction perpendicular to the extension direction of the first support structure and away from the first support portion.

13. The displaying device according to claim 1, further comprising a camera, wherein the camera is arranged in the hollow area of the first buffer portion.

14. The displaying device according to claim 1, wherein orthographic projections of the second polarizer on the plane where the first support structure is located are not superimposed with the orthographic projection of the through-hole on the plane where the first support structure is located.

15. The displaying device according to claim 14, wherein a second light shielding adhesive is arranged on a side of the array substrate away from the color film substrate, the second light shielding adhesive is arranged on a side of the second polarizer close to the through-hole, and the second light shielding adhesive is bonded with the first light shielding adhesive in the backlight module.

16. The displaying device according to claim 1, wherein the displaying device further comprises a cover plate; and
the cover plate is adhered through a bonding layer to a side of the display panel away from the backlight module.

* * * * *